(No Model.) 8 Sheets—Sheet 1.

E. E. WITTER.
POWER FENCE MAKING MACHINE.

No. 394,631. Patented Dec. 18, 1888.

Fig. 1.

WITNESSES:
Otto Berger
E. Sedgwick

INVENTOR:
E. E. Witter
BY Munn & Co.
ATTORNEYS.

(No Model.)

E. E. WITTER.
POWER FENCE MAKING MACHINE.

Patented Dec. 18, 1888.

WITNESSES:

INVENTOR:
E. E. Witter
BY Munn & Co.
ATTORNEYS.

(No Model.) 8 Sheets—Sheet 4.
E. E. WITTER.
POWER FENCE MAKING MACHINE.

No. 394,631. Patented Dec. 18, 1888.

WITNESSES:

INVENTOR:
E. E. Witter
BY Munn & Co.
ATTORNEYS.

(No Model.) 8 Sheets—Sheet 5.
E. E. WITTER.
POWER FENCE MAKING MACHINE.
No. 394,631. Patented Dec. 18, 1888.

WITNESSES:
INVENTOR:
E. E. Witter
BY
Munn & Co
ATTORNEYS.

(No Model.) 8 Sheets—Sheet 7.
E. E. WITTER.
POWER FENCE MAKING MACHINE.

No. 394,631. Patented Dec. 18, 1888.

Fig. 13.

WITNESSES:

INVENTOR:
E. E. Witter
BY
ATTORNEYS.

(No Model.) 8 Sheets—Sheet 8.
E. E. WITTER.
POWER FENCE MAKING MACHINE.

No. 394,631. Patented Dec. 18, 1888.

WITNESSES:

INVENTOR:
E. E. Witter
BY Munn & Co.
ATTORNEYS.

UNITED STATES PATENT OFFICE.

EZRA EDGAR WITTER, OF MILFORD CENTRE, OHIO.

POWER FENCE-MAKING MACHINE.

SPECIFICATION forming part of Letters Patent No. 394,631, dated December 18, 1888.

Application filed September 3, 1886. Serial No. 212,600. (No model.)

*To all whom it may concern:*

Be it known that I, EZRA EDGAR WITTER, of Milford Centre, in the county of Union, and in the State of Ohio, have invented a new and Improved Power Fence-Making Machine, of which the following is a full, clear, and exact description.

My invention relates to the construction of a fence-building machine which may be driven by steam or any other form of power, and which will be entirely automatic in action, the several parts being so arranged that the movements necessary to feed pickets to position and to bind or twist the wires about the pickets will take place alternately, the feeding mechanism being at rest when the twisting mechanism is in operation, while the feeding of the pickets is brought about when the twisting mechanism is at rest.

Reference is to be had to the accompanying drawings, forming a part of this specification, in which similar figures of reference indicate corresponding parts in all the views.

The movable parts of the machine illustrated in the drawings above referred to are supported by a main frame, 30, made up of two sections arranged at right angles the one to the other, one of the sections being arranged to support the twisting and fence-winding mechanism, while the other section supports the inclined chute from which the pickets are drawn by the picket-feeding mechanism. All the movable parts supported by the frame 30 are driven through the medium of a main power-shaft, 31, which is mounted in proper bearings that are supported by the main section of the frame 30, a driving-pulley, 32, being secured to one end of this shaft. In addition to this driving-pulley 32 the shaft 31 carries loosely-mounted gears 33 and 34, while at a point between these gears a deeply-channeled worm or spiral groove, 35, is formed upon the shaft. The gear 33 is arranged so that when driven by the shaft it will advance the twisting mechanism of the machine, while the gear 34 is arranged so that when it is advanced with the shaft 31 it will drive the mechanism employed to deliver the pickets to the twisting mechanism, and in practice I arrange the parts so that the gears 33 and 34 are alternately brought into action, this alternate movement of the gears being brought about, preferably, by such a mechanism as is illustrated in detail in Figs. 5, 6, and 7, to which figures I will now refer.

Beneath the shaft 31 there is arranged a short bar or rod, 36, which acts as a support for two upwardly-extending brackets, 37 and 38, each of said brackets being formed with a yoke, 39, said yokes being arranged to engage with grooved collars 40 and 50, which are mounted upon the shaft 31 upon both sides of the groove 35, said collars being formed with grooves that are engaged by feathers 41, formed upon the shaft 31. The collars 40 and 50 are each formed or provided with a number of outwardly-extending tapering points or fingers, 2, said fingers being so proportioned and formed that they will enter apertures or recesses 3, formed in the hubs of the gears 33 and 34, the arrangement being such that when the collar 50 is brought into engagement with the gear 34 the mechanism controlling the feeding of the pickets will be advanced, while when the collar 40 is brought into engagement with the gear 33 said gear will be revolved and the twisting mechanism will be operated.

Figure 5:
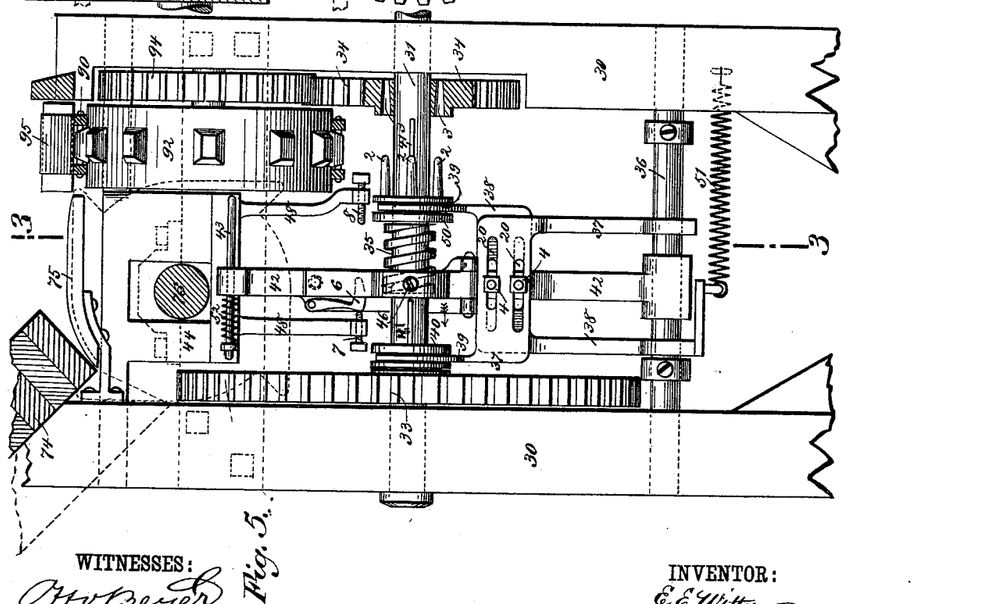
Fig. 5 is a view upon an enlarged scale illustrating in detail the construction of the mechanism employed to alternately drive the twisting and feeding mechanisms.
Figure 6:
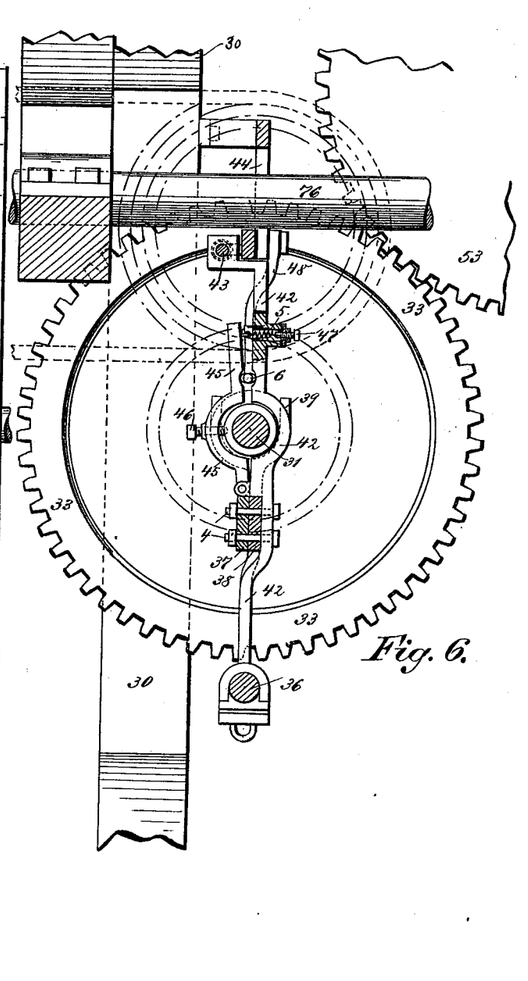
Fig. 6 is a cross-sectional view on the line 3 3 of Fig. 5.
Figures 7, 8, 11:
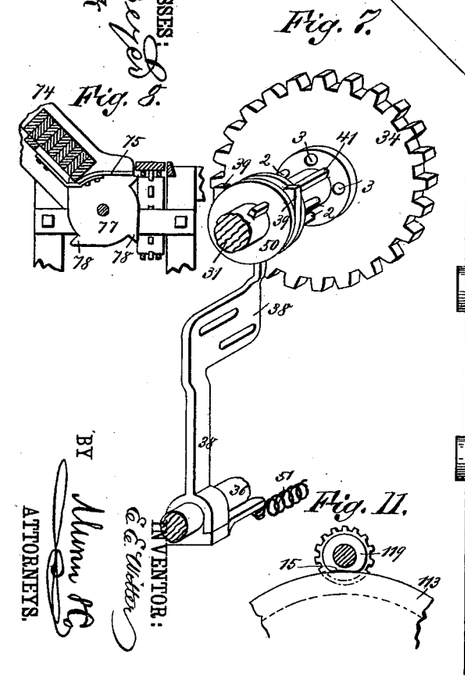
Fig. 7 is a perspective view of a portion of the main shaft of the machine, certain attachments carried by said shaft being shown in connection therewith in order that their construction may be better illustrated.
Fig. 8 is a detail view illustrating the construction and arrangement of a portion of the picket-feeding mechanism.
Fig. 11 is a detail view illustrating the construction of the enlarged collars arranged in connection with the pinions that are engaged by the mutilated gears shown in Figs. 9 and 10.

In order that the fingers 2 of the collars 40 and 50 may be brought alternately into engagement with the gears 33 and 34, I mount an arm, 42, upon the bar 36, this bar being connected by bolts 4 with the brackets 37 and 38, while the upper end of the arm 42 is guided by a short rod, 43, that is held by a bracket, 44, which is connected to the main frame 30, as best shown in Fig. 6. A folding arm, 45, is hinged to the arm 42 at a point just below the shaft 31, and this arm 45 is provided with a set-screw, 46, the point of which rides in the spiral groove 35, the upper end of the arm 45 being held to the arm 42 by a spiral spring, 5, which is connected to said arm 45 and to an adjusting-screw, 47, that is connected to the arm 42. In addition to the parts named the arm 42 carries a swinging wedge-pointed hook, 6, the heel and toe of which hang in line with two adjustable stops, 7 and 8, carried by arms 48, that extend downward from the bracket 44, the arrangement being such that as the shaft 31 is revolved in the required direction the collars 40 and 50 will through the action of the screw 46, which, as before stated, rides in the spiral groove 35, be carried in the direction of the arrow shown in Fig. 5 until the wedge-pointed hook 6 has been forced inward by the action of the stop 7; but as the wedge-pointed hook is so forced inward the arm 45 is forced outward against the tension of the spring 5 until the point of the screw 46 is thrown out of engagement with the spiral groove 35.

Immediately upon the disengagement of the point of the screw 46 the movable parts mounted on the rod 36 will be drawn backward by the action of two springs, 51 and 52, that are arranged as best shown in Fig. 5, and as these springs so act the fingers of the collar 50 will enter the recesses 3 of the gear 34, and the feeding mechanism will be advanced, it being understood that the twisting mechanism was brought into operation at the time when the fingers of the collar 40 were in engagement with the apertures formed in the hub of the gear 33; but as the springs 51 and 52 act to throw the movable portions mounted upon the bar 36 backward in a direction contrary to that in which they travel when advanced by the action of the shaft 31, the toe of the wedge-pointed hook 6 will strike against the point of the adjustable stop 8, and the hook will be forced from between the arms 45 and 42, so that the point of the screw 46 will again engage with the groove 35.

The gear 33 meshes directly with the gear 53, which is rigidly connected to or made integral with one of the twisting-wheels 54, each of said wheels 54 being a sprocket-wheel, and all of the wheels being driven in unison by a chain, 55, which derives its motion from the motion imparted by the wheel arranged in connection with the gear 53. The wheels 54 are mounted in proper bearings, 56, that are supported by the frame 30, each wheel being provided with either a straight or bevel faced flange, 65, that is arranged beyond the outer face of the machine.

Figure 2:
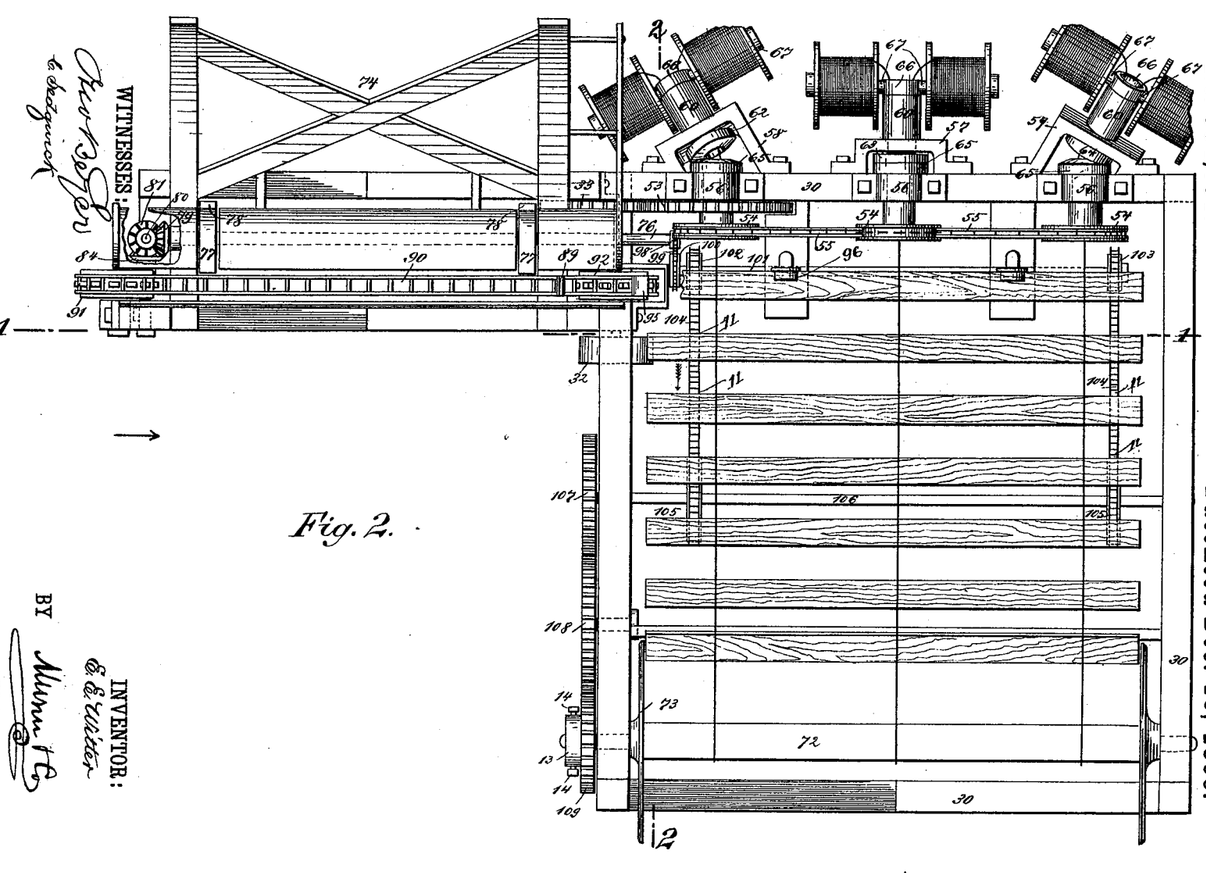
Fig. 2 is a plan view of the same.

In order that the spindles carrying the wires by means of which the pickets are to be bound together may be revolved in unison with the wire-twisting wheels 54, I support said spindles by means of sleeves 60, that are made integral with brackets 57, 58, and 59, the spindles proper being connected so as to extend at right angles from the outer ends of tubes 66, that pass through the sleeves 60, the inner ends of the tubes being provided with disks 62, 63, and 64, which disks are faced so as to run in frictional contact with the collars 65, this construction being best illustrated in Fig. 2, wherein it will be seen that the central set of the supporting-spindles are arranged so as to revolve in a vertical plane, while the other spindles are arranged in diagonal planes, the one above the other, below the horizontal plane occupied by the central set of spindles, and it will be seen that as the wheels are revolved the tubes 66, from which the spindles 67 project, will also revolve, which arrangement enables me to weave a fence without any back-twist, and from the peculiar placing of the several sets of spindles I am enabled to place the original packages or spools of wire directly upon the spindles without removing the wire from said original spools.

The wire drawn from the spools passes through the tube 66 and through the apertures 9 9, formed through the inner faces and upon opposite sides of the axes of the wheels 54, and before commencing the operation of weaving the fence the ends of the wire are carried forward and are secured to the shaft 72 of a reel, 73, which reel is operated in a manner to be hereinafter described.

The supply of pickets used in making the fence is held in an inclined chute, 74, the pickets resting upon the arms 75, the upper faces of which are curved, said arms being rigidly connected to the frame 30 and arranged to extend out over the shaft 76 of the feeding-wheels 77. These wheels 77 are formed with a number of teeth, 78, and in the construction illustrated in the drawings there are four of these teeth upon each wheel. To the end of the shaft 76 there is secured a beveled pinion, 79, that is engaged by a pinion, 81, carried by a vertical shaft, 80, which is mounted in a sleeve, 82, said sleeve being rigidly connected to the frame 30.

To the lower end of the shaft 80 there is secured a second beveled pinion, as shown at 83, and this pinion 83 is engaged by a pinion, 84, carried by a horizontal shaft, 85, said shaft being provided with a four-toothed wheel, 86, the teeth of which are arranged so as to extend within the path of stops or lugs 89, that are carried by an endless chain or belt, 90, said belt or chain being mounted just in front of the arms 75 upon sprocket-wheels 91 and 92, the shaft of the wheel 92 being that upon which the gear 94 is mounted, said gear 94 being arranged so as to be engaged by the loosely-mounted gear 34 of the shaft 31. Just in advance of each of the stops 89 the belt or chain 90 is provided with other stops or lugs, 95.

Figure 1:
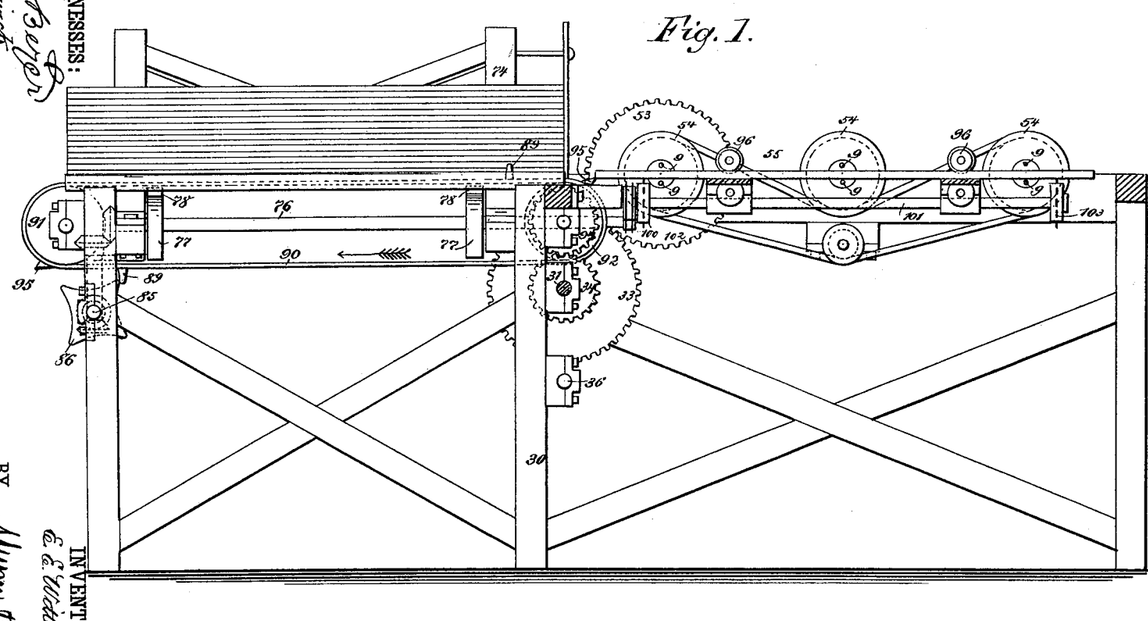
Figure 1 is a sectional elevation of my improved machine, the view being taken on the line 1 1 of Fig. 2.
Figure 3:
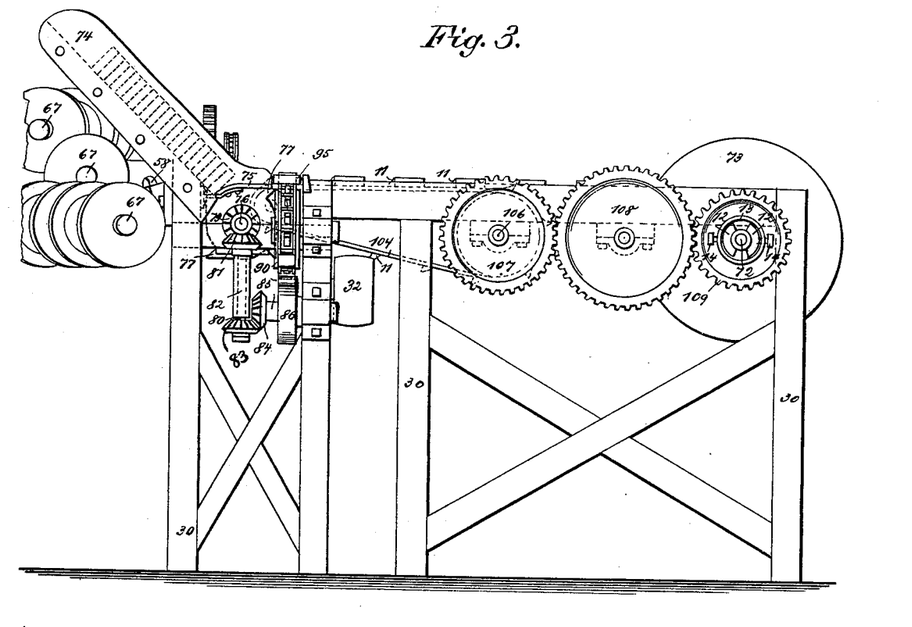
Fig. 3 is a side view of the machine, taken from the point of view indicated by the arrow in Fig. 2.
Figure 4:
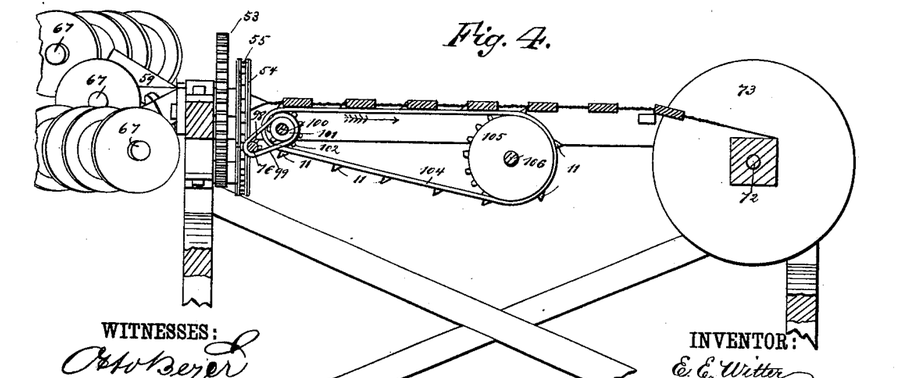
Fig. 4 is a cross-sectional view taken on the line 2 2 of Fig. 2.

From the construction described it will be seen that when the fingers or projections 2 of the collar 50 are brought into engagement with the apertures 3 of the gear 34, so that the motion of the shaft 31 will be imparted to said gear 34, the gear 94 will be revolved so as to carry the belt 90 in the direction of the arrow shown in connection therewith in Fig. 1, and as the belt 90 is so moved one of its stops 89 will be brought into engagement with one of the teeth of the wheel 86, and a continued movement of the belt will cause a quarter-revolution of the wheel, and consequently of its shaft 85. Now as the shaft 85 is revolved its motion will be imparted to the shaft 76 through the medium of the bevel-pinions 84, 83, 81, and 79, and as the said pinions are similar in so far as their diameter and the number of teeth are concerned, the movement imparted to the shaft 76 will be a quarter-revolution of said shaft, so that the wheels carried by the shaft will be moved forward, and their teeth in so moving will carry the lower picket contained within the chute 74 over across the upper faces of the arms 75 and onto the upper face of the belt 90 just in advance of one of the stops 95 in position to be advanced over the guiding-wheels 96 and between the wires issuing through the apertures 9 of the twisting-wheels 54, the several parts being so timed that a sufficient movement will be imparted to the gear 94 to carry its belt 90 forward, so as to accomplish the movement above described. Immediately after the picket has been placed as desired the fingers of the collar 50 will be withdrawn from engagement with the apertures of the gear 34 and the movement of the parts will cease, the alternate movement of the twisters being, however, immediately brought about by the engagement of the fingers of the collar 40 with the apertures in the gear 33. At the time when the shaft 76 is rotated to advance the wheels 79, in order that the pickets may be fed forward upon the belt 90, the completed fence is carried one step forward toward the reel 73, this movement being accomplished by means of a mechanism that is best illustrated in Figs. 2, 3, and 4, and which consists, essentially, of a sprocket-wheel, 98, that is carried upon the inner end of the shaft 76, and which is engaged by a chain, 99, that runs in engagement with a sprocket-wheel, 100, which latter is carried by a shaft, 101, said shaft being mounted in properly-arranged bearings, so as to extend in the line parallel with that occupied by the inner faces of the twisting-wheels 54. This shaft 101, in addition to its sprocket-wheel 100, carries two other sprocket-wheels, 102 and 103, which serve as the supports and driving-wheels for chains 104, which also run in engagement with wheels 105, that are supported by a shaft, 106.

The chains 104 are provided with teeth or projections 11, so spaced that the distance between the leading faces of the teeth is just equal to the distance between corresponding edges of the pickets when bound to place to form the fence, and as the chains are advanced in the direction of the arrow shown in Figs. 2 and 4 the fence will be carried forward away from the twisting-wheels 54 toward the reel 73, which reel receives a rotary movement through the medium of the wheels 107, 108, and 109, the gear 107 being rigidly secured to the end of the shaft 106, while the gear 109 is held in frictional contact with the shaft 72 of the reel 73 by means of the clamping-blocks 12, that are fitted between the hub 13 of the gear 109 and the said shaft 72, the pressure of the blocks upon the shaft being regulated by means of adjusting-screws 14. (Shown best in Figs. 2 and 3.)

The object of this yielding connection between the gear 109 and the shaft 72 is to provide for the decreased turning of the reel as the fence is wound thereon and the diameter of the coil increases.

Figures 9, 10:
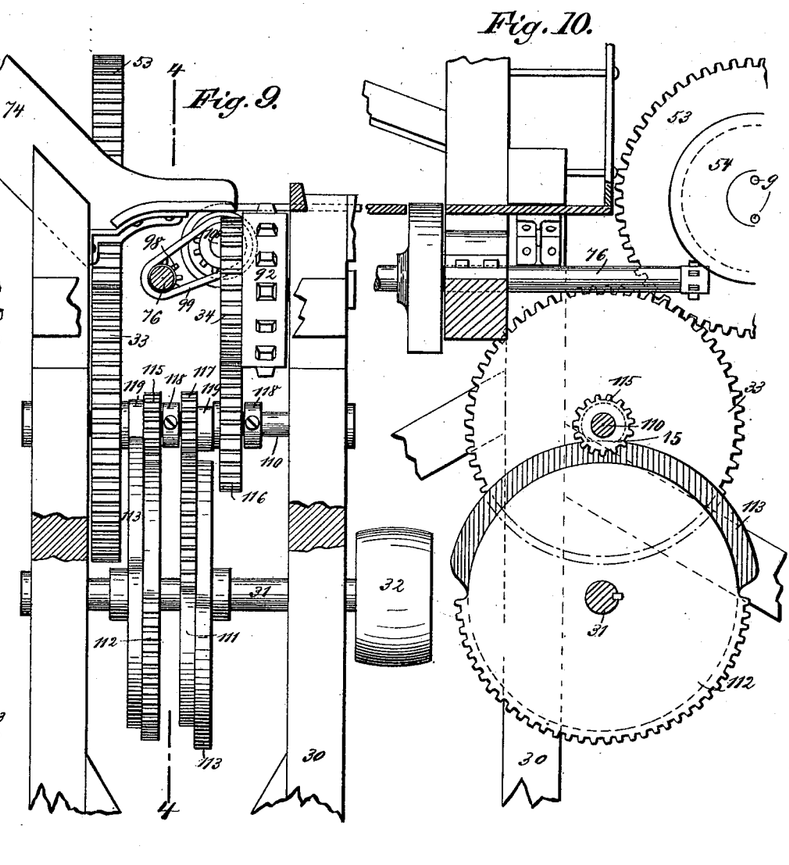
Fig. 9 is a view of a modified construction for alternately operating the twisting and feeding mechanisms.
Fig. 10 is a cross-sectional view taken on the line 4 4 of Fig. 9.
Figure 12:
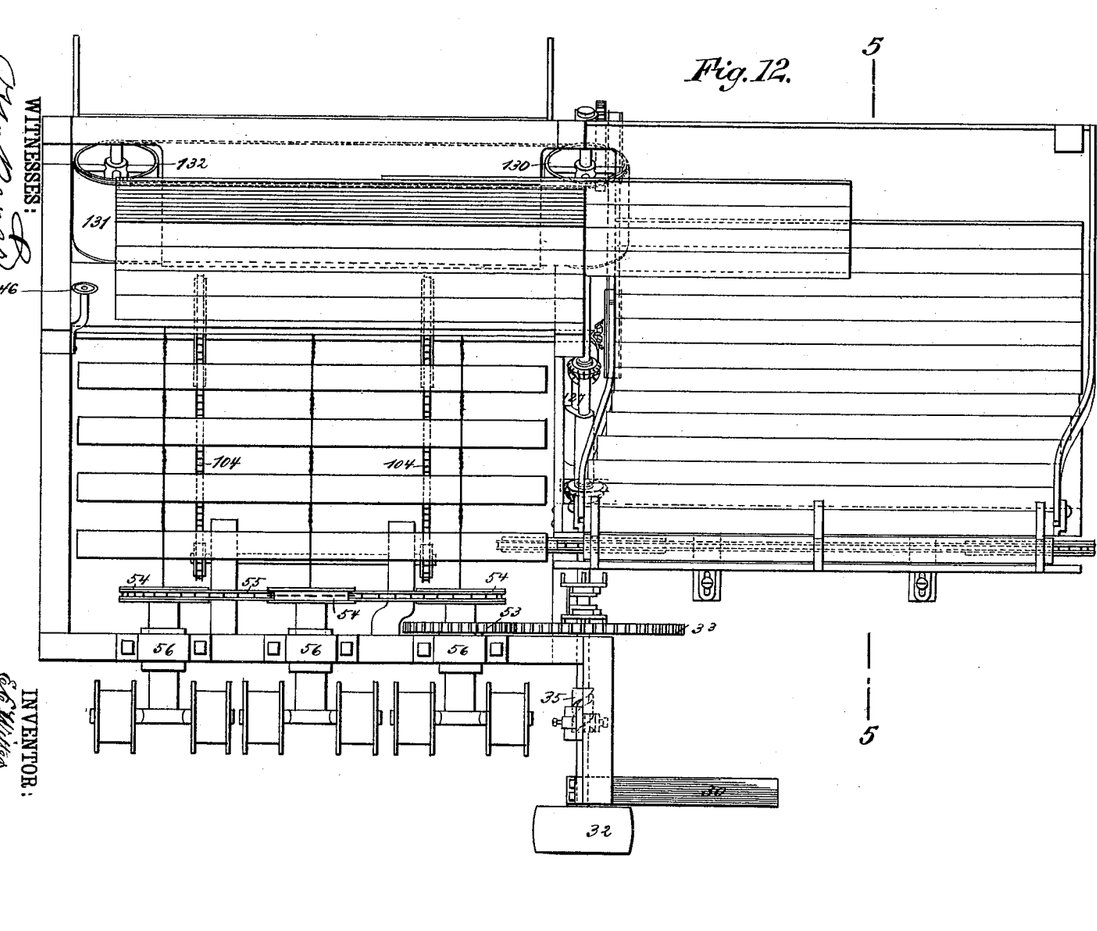
Fig. 12 is a plan view of a modified form of machine, wherein the pickets are placed in the hopper in bundles and fed to the inclined chute in lots of four or five.

In Figs. 9 and 10 I illustrate a modified construction, whereby the necessary alternate movements are imparted to the gears 33 and 34, and in the figures just referred to I interpose a shaft, 110, between the shafts 31 and gears 33 34, and I provide the shaft 31 with two correspondingly but inversely mutilated gears, 111 and 112, each of said gears being provided with a flange, 113, which extends outward somewhat beyond the line of the teeth of the gear. The gear 33 is made integral with or is rigidly connected to a pinion, 115, the gear and the pinion being loosely mounted upon the shaft 110, while the gear corresponding to the gear 34 is placed upon the opposite side of the sprocket-wheel 92, and is engaged by a gear, 116, that is made integral with or rigidly connected to a pinion, 117, said pinion and gear being loosely mounted upon shaft 110, all lateral movement of the gears and pinions supported by said shaft being prevented by collars 118, that are arranged as best shown in Fig. 9.

Each of the pinions 115 and 116 is provided with collars 119, the peripheries of said collars being cut away so as to form a notch, 15, the depth of said notch being so proportioned that when the teeth of the pinion are out of engagement with the teeth of the mutilated gear the flange of said gear will ride within the notch and prevent any turning of the pinion or the gear in connection with which it is arranged—that is, to which it is rigidly connected. By this arrangement for holding the parts in place I insure a perfect register and intermeshing of the mutilated gears with their pinions, when said gears again move to a position to engage with their pinions.

Figures 15, 16, 17, 18:
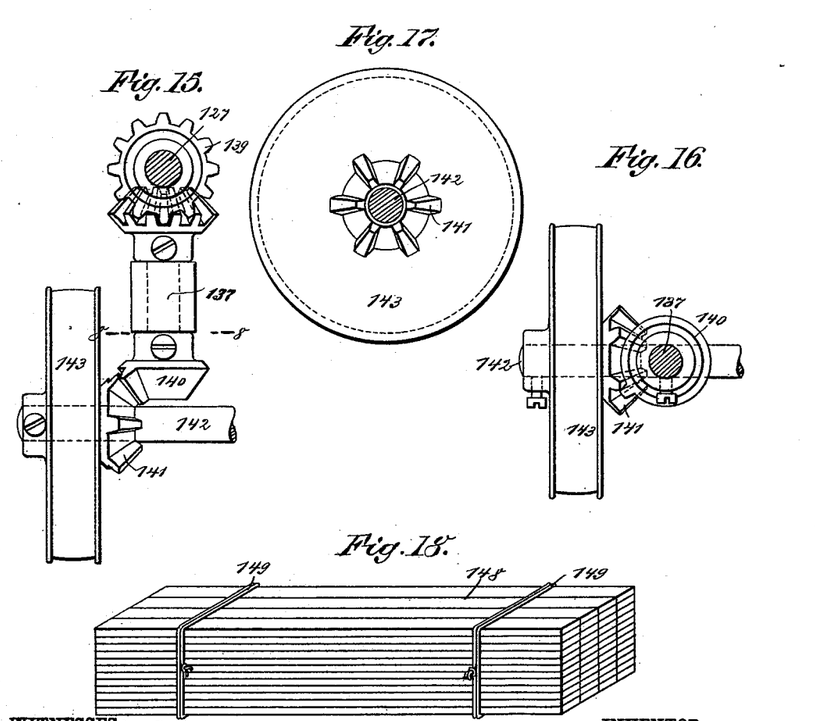
Fig. 15 is a detail view illustrating the construction of the single-toothed pinion and its connections employed to advance and wind the completed fence upon the reel.
Fig. 16 is a sectional view taken on the line 8 8 of Fig. 15.
Fig. 17 is a face view of the pinion and pulley driven by the single-toothed pinion shown in Figs. 15 and 16.
Fig. 18 is a perspective view illustrating the manner in which the pickets are bundled prior to being deposited in the machine.

In Figs. 12 to 18, inclusive, I illustrate my improved form of machine as adapted to receive the pickets in bundles, wherein the pickets are bound together substantially in the manner illustrated in Fig. 18, and to do this I provide a hopper, 120, which, for convenience, is preferably arranged directly over the reels 73, the chute 74 being arranged, as in the construction heretofore described, at one side of the twisting mechanism. In this adaptation of the machine the shaft 31 is provided, as in the former case, with a worm, 35, and the arms 42 and 45 are also arranged as in the construction best shown in Figs. 5 and 6, except that in this case the arm 42 is connected to a sliding shaft, 121, by means of a set-screw, 122, while collars 123, which correspond to the collars 40 and 50, are engaged by yokes 124, the lower ends of which are also rigidly connected with the shaft 121. The upper end of the arm 42 is guided by a rod, 43, and the spring 52 is arranged as hereinbefore described, and as illustrated in Fig. 5; but the spring 51 is in this case simply coiled about the shaft 121, as indicated.

Upon the end of the shaft 31 there is mounted a pinion, 125, which engages with a beveled pinion, 126, that is carried upon the lower end of a shaft, 127, said shaft being mounted in appropriate bearings, so as to extend in a line that is about parallel with the under side of the chute 74.

To the upper end of the shaft 127 there is fixed a pinion, 128, which engages with an internally-toothed gear, 129, said gear being made integral with or rigidly connected to a drum, 130, that is arranged so as to support a carrier-belt, 131, the upper length of said belt being arranged to pass over the bottom of the hopper 120, the belt being guided and supported by the second drum, 132. Upon this belt 131 there are two lugs or projections, 133 and 134, the construction being such that after the bundle of pickets has been placed in the hopper 120, and after a rotary motion has been imparted to the shaft 31, the belt 131 will be advanced and the under tier or series of pickets will be carried forward and into the chute 74, the pickets above the lower set or series being held against any forward movement by a rod, 135, which is adjustably connected to the frame of the hopper, as best shown in Fig. 13.

It will be understood that the pickets are delivered to the hopper so as to rest upon their broad side faces, and consequently I have found it possible to dispense with the wheels 77, that were employed in the construction illustrated in the first eleven figures of the drawings, the pickets in the machine under consideration at present sliding directly down the chute and against an adjustable stop, 136, that is arranged at the lower end thereof, said stop being so placed that the lower picket will be forced to a position above the carrier belt or chain 90, so that when said chain is advanced the picket above it will be carried forward between the wires issuing from the twisting-wheels 54, it being understood that the twisting mechanism and the feeding mechanism are brought into alternate action, as in the construction hereinbefore described.

Figure 13:
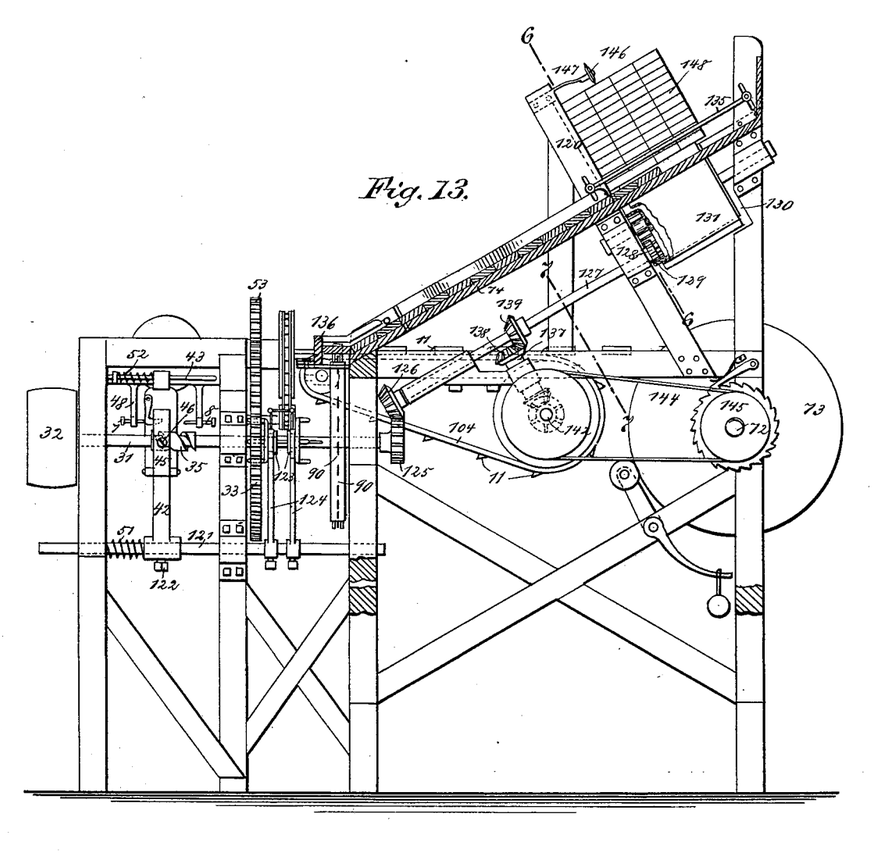
Fig. 13 is a cross-sectional view of the machine illustrated in Fig. 12, the view being taken on the line 5 5 of said figure.
Figure 14:
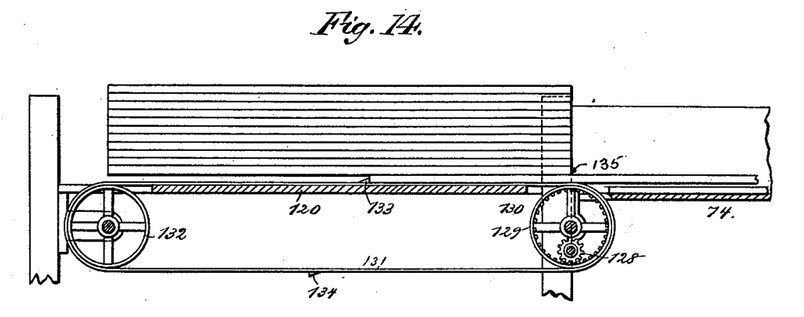
Fig. 14 is a longitudinal sectional view of the hopper and feeding mechanism shown in Figs. 12 and 13, the view being taken on the line 6 6 of Fig. 13.

After the pickets have been woven to place—that is, after the wires have been twisted about them—they are advanced toward and wound upon the reel 73 by a mechanism such as that shown best in Figs. 13 to 17, inclusive. The mechanism referred to consists of a shaft, 137, which carries a pinion, 138, that is engaged by a pinion, 139, said pinion 139 being keyed to the shaft 127. To the lower end of the shaft 137 there is secured a single-toothed pinion, 140, which is arranged to engage with a pinion, 141, that is fixed to the shaft 142, upon which the rear supporting wheels or pulleys of the belts or chains 104 are mounted, from which arrangement it will be seen that the belts or chains 104 will be advanced step by step in order to carry the completed fence toward the reel 73, and in order that the reel may be revolved as required to wind the fence thereupon I provide the shaft 142 with a pulley, 143, over which there passes a belt, 144, which engages with a pulley, 145, that is secured to the shaft 72 of the reel 73, the frictional contact between the belt 144 and its pulleys being only sufficient to impart a proper motion to the reel. This frictional contact is regulated by a belt-tightener arranged as shown in Fig. 13.

Above the hopper I arrange band-cutters 146, which are preferably knife-edged circular disks that are supported by spring-arms 147, so that as a bundle of pickets—such as that shown at 148—is placed within the hopper and shoved forward to place the cutters 146 will sever the binding-cords 149.

Having thus fully described my invention, I claim as new and desire to secure by Letters Patent—

1. In a fence-building machine, the combination, with a chute, of the feeding mechanism and the twisting mechanism, gears for operating said mechanisms, respectively, and a clutch adapted to reciprocate between and to alternately engage said gears, whereby the two mechanisms will be alternately thrown into action, substantially as shown and described.

2. In a fence-building machine, the combination, with the main power-shaft, of a picket-feeding mechanism and a picket-binding mechanism, idle gear-wheels on said shafts for operating said mechanisms, respectively, a clutch connected to said power-shaft, and mechanism, substantially as described, for reciprocating said clutch between said gears, whereby the latter are engaged and operated alternately, as set forth.

3. In a fence-building machine, the combination, with the main power-shaft, a picket-feeding mechanism, and a picket-binding mechanism, of idle gear-wheels adapted to be operated by said shaft for operating said feeding and binding mechanisms, respectively, a clutch connected to said shaft, a worm for forcing said clutch in one direction into engagement with one of said gear-wheels, and a spring or springs for forcing said clutch in the opposite direction into engagement with the other gear-wheel, substantially as set forth.

4. The combination, with the chute 74, having the curved plate 75 at its bottom, of the toothed wheels 77 and 86, connected by gearing, and an endless chain or belt having stops adapted to come in contact with the teeth of the wheel 86, substantially as and for the purpose set forth.

5. In a fence-building machine, the combination, with a chute, of wheels 77, provided with teeth, as 78, an endless chain or belt, 90, provided with projections 95 and stops 89, a cam or wheel, 86, connections between the cam of wheel 86 and the shaft of the wheels 77, and the mechanism for advancing the endless chain or belt, as and for the purpose stated.

6. In a fence-building machine, the combination, with an inclined chute, of picket-feeding wheels, an endless belt or chain having stops or lugs and arranged in the vicinity of the feeding-wheels, a cam or wheel, 86, geared to said feeding-wheels and adapted to be revolved by the lugs or stops on said belt, wire-twisting wheels, endless chains arranged to advance the finished fence, and mechanism, substantially as described, whereby the several devices are operated, as shown and set forth.

7. In a fence-building machine, the combination, with the picket-feeding mechanism, the picket-binding mechanism, and the main power-shaft, of collars carried by the shaft and arranged to slide thereon and turn therewith, fingers formed upon the collars, loosely-mounted gears formed with apertured hubs gearing with the said feeding and binding mechanisms, respectively, and a mechanism, substantially as described, whereby the fingers of the collars are brought into alternate engagement with the apertures in the hubs of the gears, substantially as described.

8. In a fence-building machine, the combination, with the main power-shaft formed with the worm 35 and feathers 41, of an arm, 42, mounted upon proper guides, springs arranged in connection with the arm 42, an arm, 45, hinged to the arm 42, a spring, 5, connecting the free end of the arm 45 with the arm 42, a screw or stop, 46, carried by the arm 45 and arranged to engage with the worm 35, a wedge-pointed swinging hook, 6, and stops 7 and 8, collars 40 and 50, mounted on the power-shaft, said collars being formed with fingers 2, and grooves within which the feathers 41 ride, brackets formed with clutches 39, that engage with the collars 40 and 50, the brackets being connected to the arm 42, and gears 33 and 34, formed with apertured hubs and loosely mounted on the power-shaft, the said gears being arranged to operate the twisting and feeding mechanisms, respectively, substantially as described.

9. In a fence-building machine, the combination, with the main power-shaft formed with a worm, 35, and feathers 41, of an arm, 42, mounted upon proper guides, springs arranged in connection with the arm 42, an arm, 45, hinged to the arm 42, a spring, 5, connecting the free end of the arm 45 with the arm 42, a screw or stop, 46, carried by the arm 45 and arranged to engage with the worm 35, a wedge-pointed swinging hook, 6, and stops 7 and 8, collars 40 and 50, mounted on the power-shaft, said collars being formed with fingers 2 and grooves, within which the feathers 41 ride, brackets 37 and 38, formed with elongated slots 20 and connected with the arm 42 by bolts 4, which pass through the slots 20, clutches 39, formed on the brackets and arranged to engage with the collars 40 and 50, and gears 33 and 34, formed with apertured hubs and loosely mounted on the power-shaft, the said gears being arranged to operate the twisting and feeding mechanisms, respectively, substantially as described.

10. In a fence-building machine, the combination, with wire-twisting wheels formed with disks, of spool-spindles carried by tubes formed with disks that run in contact with the disks of the wire-twisting wheels, brackets formed with sleeves which support the spindle-tubes, and a mechanism whereby the twisting-wheels are rotated, substantially as described.

11. In a fence-building machine, the combination, with wire-twisting wheels, of spool-spindles carried by tubes adapted to operate in connection with tubes joined to the wire-twisting wheels, and brackets formed with sleeves which support the spindle-tubes, the brackets being arranged to extend from the frame of the machine at varying angles, and a mechanism whereby the twisting-wheels are rotated, substantially as described.

12. In a fence-building machine, the combination, with wire-twisting wheels formed with disks, of spool-spindles carried by tubes formed with disks that run in contact with the disks of the wire-twisting wheels, brackets formed with sleeves which support the spindle-tubes, the brackets being arranged to extend from the frame of the machine at varying angles, and a mechanism whereby the twisting-wheels are rotated, substantially as described.

13. The combination, with the twisting-wheels formed with disks 65, of brackets, as 57, 58, and 59, formed with sleeves 60, tubes 66, arranged within said sleeves, disks, as 62, 63, and 64, arranged to run in contact with the disks 65, spindles 67, carried by the tubes 66, and a mechanism whereby the twisting-wheels are revolved, substantially as described.

14. The combination, with a chute, of the wheels 77, provided with teeth, as 78, an endless chain or belt, 90, provided with projections 95 and 89, a cam or wheel, 86, connections between the cam or wheel 86 and the shaft of the wheels 77, a sliding collar, 50, a gear, 34, a mechanism whereby the collar and the gear are brought into engagement, a gear, 94, and sprocket-wheels 91 and 92, all the parts being arranged substantially as and for the purpose stated.

15. In a reel for a fence-building machine, the combination, with the reel-shaft and the advancing mechanism, of a gear-wheel on said shaft, connected with said advancing mechanism and adapted to be revolved thereby, friction-blocks carried by said gear-wheel engaging said shaft, and set-screws for regulating the pressure of said blocks upon said shaft, substantially as set forth.

EZRA EDGAR WITTER.

Witnesses:
T. B. FULTON,
I. N. HAMILTON.